United States Patent [19]

Hougen

[11] Patent Number: 4,557,641
[45] Date of Patent: Dec. 10, 1985

[54] ANNULAR CUTTER

[76] Inventor: Everett D. Hougen, G-5072 Corunna Rd., Flint, Mich. 48504

[21] Appl. No.: 531,083

[22] Filed: Sep. 12, 1983

[51] Int. Cl.⁴ .............................................. B23B 41/02
[52] U.S. Cl. ..................................... 408/204; 408/206
[58] Field of Search ...................... 408/204, 203.5, 205, 408/206, 207

[56] References Cited

U.S. PATENT DOCUMENTS

| 3,609,056 | 9/1971 | Hougen | 408/204 |
| 3,860,354 | 1/1975 | Hougen | 408/206 |
| 4,322,188 | 3/1982 | Hougen | 408/206 |
| 4,452,554 | 6/1984 | Hougen | 408/206 |

FOREIGN PATENT DOCUMENTS

| 2237942 | 7/1973 | Fed. Rep. of Germany | 408/206 |
| 2631138 | 1/1978 | Fed. Rep. of Germany | 408/204 |
| 2100151 | 12/1982 | United Kingdom | 408/204 |

Primary Examiner—William R. Briggs
Attorney, Agent, or Firm—Barnes, Kisselle, Raisch, Choate, Whittemore & Hulbert

[57] ABSTRACT

A hole cutter has a fluted annular wall formed with a plurality of circumferentially spaced teeth around the lower end thereof, the successive teeth being connected by webs of reduced thickness. Between successive teeth each web is formed with a gullet, the upper end of which is defined by a wall which inclines upwardly in a radially outward direction. The upper end wall of the gullet comprises a radially inner section and a radially outer section. The radially inner section is inclined to the horizontal at a substantially less angle than the radially outer section. The two wall sections intersect in a shoulder which is spaced substantially closer to the radially inner face of the web that the radially outer face of the web.

9 Claims, 5 Drawing Figures

ANNULAR CUTTER

This invention relates to an annular cutter of the type having a cylindrical side wall formed with a plurality of circumferentially spaced teeth around the lower end thereof and with a plurality of flutes extending lengthwise of the cutter around its outer periphery.

The efficiency of an annular cutter, and particularly the ease with which it can be rotated and advanced into a workpiece, depends to a large extent on the ease with which the metal chips generated by the teeth of the cutter can be directed upwardly through the flutes of the cutter. Unless the cutter is designed to promote a smooth chip flow upwardly through the flutes, the flutes will become clogged with chips which, if the cutter continues to advance into the workpiece, can be dislodged upwardly through the flutes only by the chips being cut therebelow. This results in surging which produces an erratic cutting action and also results in excessive wear and breakage. One way of improving the chip flow is to form a plurality of cutting edges on each tooth designed to cut separate chips, each of which has a width not greater than the depth of the adjacent flute. This type of cutter is shown in U.S. Pat. No. Re. 28,416. However, even with cutters of the general type shown in this patent, unless the chips cut by the radially innermost cutting edges of the teeth can be directed freely, not only radially outwardly, but also upwardly through the radially adjacent flutes, the problems referred to above are not overcome.

Cutters of the general type shown in the aforesaid patent are formed with a gullet between successive teeth in the web section of the cutter side wall, a gullet extending upwardly from each innermost cutting edge. In the prior art cutter the upper end wall of the gullet is inclined upwardly and radially outwardly and/or the radially inner cutting edge is inclined radially for the purpose of directing the chips cut by the inner cutting edges outwardly into the adjacent flute. Experience has shown that when the upper end wall of the gullet is inclined to the horizontal at an angle greater than about 40°, the web section of the cutter side wall is excessively weakened and breakage becomes a serious problem. Likewise, when the inner cutting edge is inclined radially in excess of about 20°, the chips generated by the inner cutting edges are directed too sharply in a radially outward direction and, as a consequence, impinge immediately against the wall of the hole being cut. This also results in clogging of the flutes. Consequently, it has been the practice to incline this upper end wall of the gullet a maximum of about 38° to the horizontal. However, I have found that when the upper end of the gullet is inclined to the horizontal at an angle of not more than about 40° and even when the inner cutting edges are only slightly inclined radially, the chip cut by the inner cutting edge is directed radially outwardly too abruptly by the upper end wall of the gullet. The chip is actually directed radially outwardly against the wall of the hole being cut rather than upwardly through the adjacent flute.

The present invention has for its object the provision of a cutter of the type described wherein each gullet is formed with a wall at its upper end which assists in directing the chip cut by the inner cutting edge upwardly through the flute without materially affecting the strength of the web section of the cutter.

More specifically, it is an object of the present invention to form the upper end wall of each gullet with a radially inner section inclined to the horizontal at an angle of not more than 40° and with a radially outer section inclined to the horizontal at a substantially greater angle.

Other objects, features and advantages of the present invention will become apparent from the following description and accompanying drawing, in which.

Figure 1:
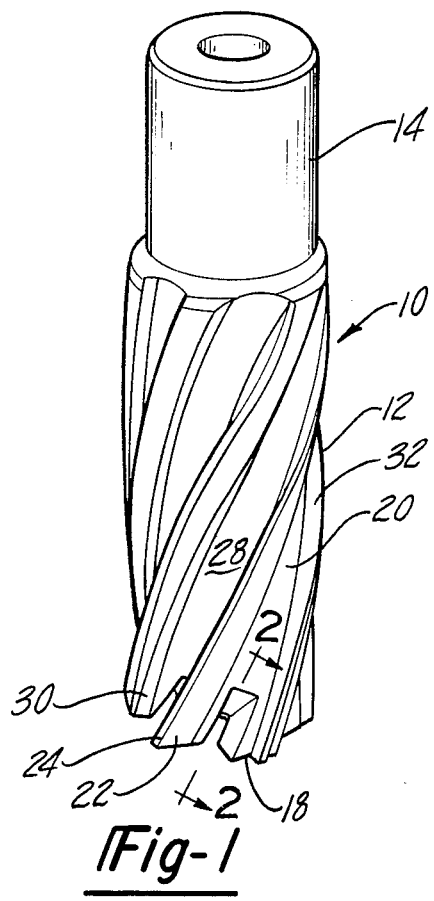
FIG. 1 is a perspective view of a cutter in accordance with the present invention.

The annular hole cutter of the present invention is designed for cutting holes in metal and is generally designated 10 in FIG. 1. The cutter includes a body 12 and a shank 14. Cutter body 12 is of inverted cup shape, having a side wall 16, the length of which is greater than the thickness of the workpiece in which the hole is to be cut. The lower end of side wall 16 is formed around its periphery with a plurality of circumferentially spaced cutting teeth 18. Around its outer periphery side wall 16 is formed with a spiral flute 20 adjacent each cutter tooth. The successive flutes 20 are separated by a land 22 at the periphery of the cutter. The leading edge of each land 22 is formed with a narrow margin 24. The portions of the annular side wall 16 of the cutter between successive teeth comprise webs 26. Webs 26 have a thickness approximately one-half the thickness of side wall 16. The radially outer face 28 of each web 26 defines the radially inner wall of each flute 20. Each flute 20 includes a circumferentially leading side wall 30 and a circumferentially trailing side wall 32.

In the cutter illustrated in the drawings each tooth is formed with a radially inner cutting edge 34 and a radially outer cutting edge 36. Cutting edge 34 is spaced forwardly in the direction of rotation of the cutter from cutting edge 36. Cutting edge 34 is located at the lower end of the trailing face 38 of a gullet 40. Cutting edge 36 is located at the lower end of the trailing face 32 of flute 20.

Figure 2:
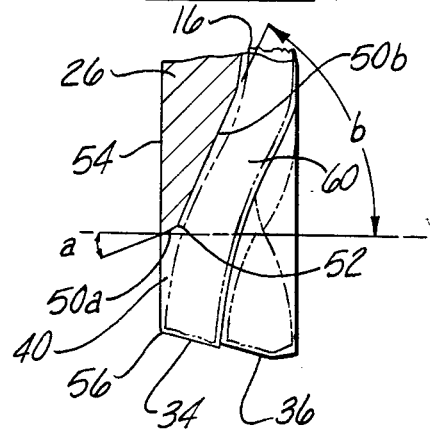
FIG. 2 is a fragmentary sectional view taken along the line 2—2 in FIG. 1.
Figure 3:
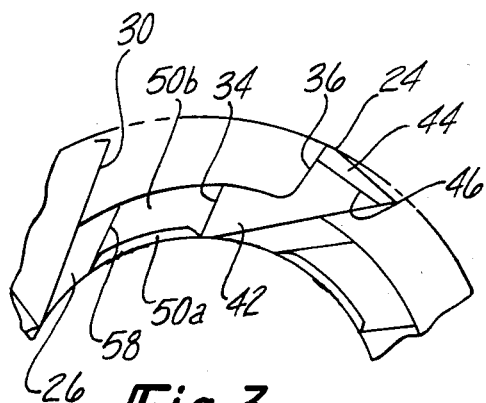
FIG. 3 is a fragmentary bottom plan view of the cutter.
Figure 4:
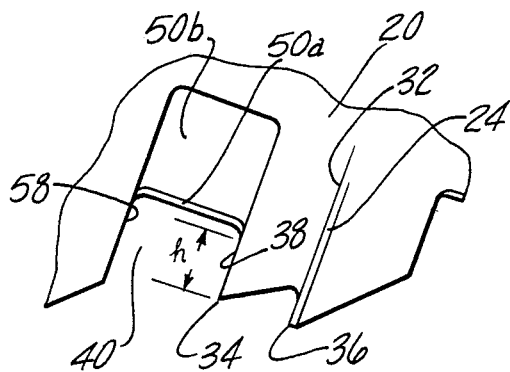
FIG. 4 is a fragmentary side elevational view of the cutter on an enlarged scale.
Figure 5:
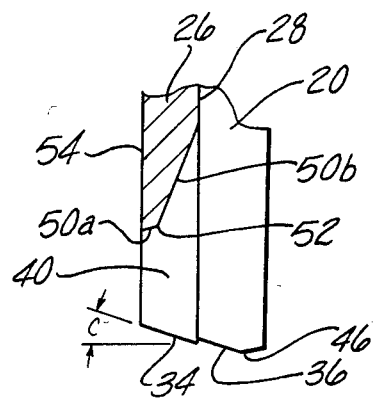
FIG. 5 is a view similar to FIG. 2.

The bottom face of each tooth 18 is formed with two back-off or clearance faces 42,44. In the operative condition of the cutter (FIG. 1) the radially inner back-off face 42 inclines axially upwardly and radially inwardly and the radially outer back-off face 44 inclines axially upwardly and radially outwardly. In addition, each of these back-off faces inclines upwardly from its respective cutting edge in a circumferential direction to a slight extent (for example, 8 to 10°) to provide the necessary clearance for the cutting edges as the tool is rotated and fed axially into a workpiece. The two back-off faces 42,44 intersect in a downwardly projecting crest 46 which in turn intersects the radially outermost cutting edge 36. The radial inclination of the outer back-off face 44 is in the range of about 5 to 35° to the horizontal, and preferably about 10°. The radially inner back-off face 42 inclines radially to the horizontal at an angle of between −3 to +20°, and preferably not more than about 15°. As a result of the inclination of these back-off faces 42,44 in both a radial and a circumferential direction, cutting edges 34,36 are not only staggered circumferentially as shown in FIG. 3, but are also staggered vertically as shown in FIGS. 2, 4 and 5.

The present invention is concerned primarily with the gullet 40 and, more specifically, with the configuration of the upper end wall 50 of the gullet. As shown in the drawings, the upper end wall of the gullet is formed as two sections, a radially inner section 50a and a radially outer section 50b. It will be observed that the angle of inclination a of wall section 50a to the horizontal is substantially less than the angle of inclination b of the wall section 50b. The wall sections 50a,50b intersect at 52. It will be observed that the shoulder formed by the line of intersection 52 is located radially much closer to the radially inner face 54 of web 26 than the radially outer face 28 thereof. The angle a may vary from zero to about 40° and angle b may vary from about 45° to 70°. Although it is preferred that both angles a and b are at or near the maximum of their respective ranges, on cutters where side wall 16 is relatively thin (0.150" or less) these angles may be progressively reduced as the wall thickness is reduced in order to maximize wall strength. These angles can be reduced on thinner wall cutters since the narrower inner chip generated by a thinner web can be directed into the flute with less difficulty than a wide chip. The wall section 50a should be spaced vertically above the inner end 56 of the inner cutting edge 34 a distance of not less than about 0.020". The line of intersection 52 between the wall sections 50a,50b should be spaced radially from the inner periphery 54 of web 26 a distance of between about 0.020" and 0.035". As explained hereinafter, the radial location of the line of intersection 52 is related to a large extent to the angle of inclination of the inner cutting edge 34 (angle c in FIG. 5) and the daylight height h of the gullet (the vertical distance between the point 56 and the portion of wall section 50a which is circumferentially adjacent the trailing face of gullet 40).

In the embodiment illustrated, gullet 40 is formed by means of a cylindrical cutting tool so that the leading face 58 of gullet 40 is generally parallel to the trailing face 38 of the gullet and the wall sections 50a, 50b are generally perpendicular to these faces. If desired, the gullet can be formed so that the wall sections 50a,50b are of arcuate configuration similar to that shown in the aforesaid patent rather than of generally rectangular configuration.

As mentioned previously, the radial location of the intersection line 52 is related to a large extent to the angle c and the distance h. This is predicated on the fact that the chip generated by cutting edge 34 is directed upwardly away from the cutting edge in a direction generally perpendicular to the radially inclined cutting edge. Thus, if the angle c is about 15°, then the chip 60 generated by this cutting edge will also be directed upwardly and radially outwardly at an angle of about 15° to the horizontal as shown in FIG. 2. To the extent possible, the line of intersection 52 should be located so that the chip 60 directed upwardly by cutting edge 34 will clear line 52 or at least will pass the line of intersection 52 with minimum obstruction from the shoulder it forms. In this way the chip will be guided smoothly upwardly into the adjacent flute 20 by the wall section 50b. If the line of intersection 52 is located radially too far from the inner periphery 54 of web 26 or is located too close to the end 56 of cutting edge 34, the chip 60 would impinge excessively against wall section 50a and would consequently be directed radially outwardly in an abrupt manner against the wall of the hole being bored in the workpiece. When this occurs, the chips will not flow freely upwardly through flute 20 and the flutes tend to be clogged with chips. As a consequence, excessive surges occur in the thrust loads on the cutter and an erratic cutting action results. However, when the chips 60 generated by cutting edges are not directed abruptly radially outwardly, they are guided smoothly upwardly into flutes 20 by the steeply inclined wall section 50b.

With the above-described arrangement it will be observed that the portion of web section 26 directly above gullet 40 does not terminate in a thin knife edge, but rather in a blunt thickened edge defined by wall section 50a. Wall section 50a thus imparts substantial strength to the thinned portion of the web and thus reduces very substantially the tendency for the cutter to break because of an excessively weak web section. In addition, tests have shown that with a cutter constructed in accordance with the present invention the cutting action is smooth as compared with the erratic cutting action produced by cutters in accordance with the prior art and the thrust required to advance the cutter into the workpiece is likewise very substantially lessened and the power required to rotate the cutter is somewhat lessened.

I claim:

1. An annular hole cutter having a cylindrical side wall provided with a plurality of teeth spaced circumferentially around the lower end thereof and a plurality of flutes extending upwardly around the outer periphery of said side wall from the lower end thereof, each tooth being connected with the next successive tooth by a circumferentially extending web at the inner periphery of said side wall, said webs being juxtaposed radially with said flutes so that the radially outer face of each web comprises the radially inner face of the radially adjacent flute, each flute having generally radially extending leading and trailing side walls, each tooth having a cutting edge extending radially through said web, each web being formed with a gullet extending upwardly from said cutting edge, each gullet having circumferentially spaced leading and trailing side walls and an upper end defined by a wall which inclines upwardly in a radially outward direction, said upper end wall comprising a radially inner section and a radially outer section which intersect intermediate the radially inner and outer faces of said web, said outer wall section being inclined to the horizontal at an angle of between about 45 to 70° and said inner wall section being inclined to the horizontal at an angle not greater than about 40°, said line of intersection being spaced radially substantially closer to the radially inner face of said web than the outer face thereof.

2. An annular hole cutter as called for in claim 1 wherein said cutting edge is inclined upwardly in a radially inward direction and said line of intersection is diposed above said cutting edge such that the chip cut thereby is directed upwardly past said line with minimum obstruction therefrom.

3. An annular hole cutter as called for in claim 1 wherein the portion of said inner wall section adjacent the trailing face of the gullet is located above the radially inner end of said cutting edge a distance of at least about 0.020".

4. An annular hole cutter as called for in claim 3 wherein said line of intersection is spaced radially outwardly from the inner face of the web a distance of about 0.020 to 0.035".

5. An annular hole cutter as called for in claim 4 wherein said cutting edge inclines upwardly in a radially inward direction at an angle of not more than about 20°.

6. An annular hole cutter as called for in claim 5 wherein said edge inclines upwardly at an angle of not more than about 15°.

7. An annular hole cutter as called for in claim 1 wherein said cutting edge has a radial extent equal to the thickness of said web, each tooth having a second cutting edge spaced radially outwardly from said first-mentioned edge, said second cutting edge being staggered circumferentially rearwardly from the first cutting edge relative to the direction of rotation of the cutter, said second cutting edge having a radial extent corresponding to the depth of said flute and being disposed at the lower end of the trailing side wall of the flute.

8. An annular hole cutter as called for in claim 1 wherein said outer wall section is inclined at an angle of about 60°.

9. An annular hole cutter as called for in claim 8 wherein said inner wall section is inclined at an angle of about 38°.

* * * * *